United States Patent
Davies-Moore et al.

(10) Patent No.: US 8,626,141 B2
(45) Date of Patent: Jan. 7, 2014

(54) METHOD AND APPARATUS FOR CUSTOMIZING A USER INTERFACE MENU

(75) Inventors: Alexander Davies-Moore, Corfe Mullen (GB); Peter D. Triplow, Brockenhurst (GB); Matthew A. Sheppard, Dorset (GB)

(73) Assignee: QUALCOMM Incorporated, San Diego, CA (US)

( * ) Notice: Subject to any disclaimer, the term of this patent is extended or adjusted under 35 U.S.C. 154(b) by 650 days.

(21) Appl. No.: 12/512,619

(22) Filed: Jul. 30, 2009

(65) Prior Publication Data

US 2011/0028138 A1 Feb. 3, 2011

(51) Int. Cl.
H04M 3/00 (2006.01)

(52) U.S. Cl.
USPC ........... 455/418; 455/405; 715/765; 715/764; 715/766; 715/783; 715/789; 715/791; 715/796

(58) Field of Classification Search
USPC .......... 455/418; 715/765, 764, 766, 783, 789, 715/791, 796
See application file for complete search history.

(56) References Cited

U.S. PATENT DOCUMENTS

| | | | |
|---|---|---|---|
| 5,396,264 | A | 3/1995 | Falcone et al. |
| 5,821,936 | A | 10/1998 | Shaffer et al. |
| 2003/0009507 | A1* | 1/2003 | Shum ........................... 709/104 |
| 2005/0120313 | A1 | 6/2005 | Rudd et al. |
| 2007/0043726 | A1* | 2/2007 | Chan et al. ........................ 707/9 |
| 2007/0083827 | A1* | 4/2007 | Scott et al. ..................... 715/811 |
| 2008/0313315 | A1 | 12/2008 | Karaoguz et al. |
| 2009/0063179 | A1 | 3/2009 | Huang |
| 2009/0119773 | A1* | 5/2009 | D'Amore et al. ............... 726/21 |
| 2010/0325122 | A1* | 12/2010 | Yassin ........................... 707/759 |

FOREIGN PATENT DOCUMENTS

| | | |
|---|---|---|
| CN | 1138384 A | 12/1996 |
| EP | 1265425 | 12/2002 |
| GB | 2381431 | 4/2003 |
| JP | 2004178363 A | 6/2004 |
| WO | WO 2004086211 | 10/2004 |
| WO | WO 2008152381 A1 * | 12/2008 |

OTHER PUBLICATIONS

International Search Report and Written Opinion—PCT/US2010/043791, International Search Authority—European Patent Office—Nov. 15, 2010.

* cited by examiner

*Primary Examiner* — Khalid Shaheed
(74) *Attorney, Agent, or Firm* — James T. Hagler

(57) ABSTRACT

Methods and apparatus enable a mobile device to suggest available applications or features in which a user may be interested to the user based upon the user's past and current mobile device usage patterns. The mobile device may monitor the specific application/features used and their frequency of use. The mobile device may determine other available applications/features that the user may be interested in using based upon the frequency of use of applications or features and information which indicates a likelihood of user interest in one application or feature based upon usage of another application or feature. Applications or features determined to be potentially of interest to the user may be presented to the user in the form of suggestions to be added to the user interface menu so that the user can elect to accept or rejection the suggestion to modify the menu.

51 Claims, 11 Drawing Sheets

301

| Application/Feature | Frequency |
|---|---|
| Camera | 20 |
| Voice Recorder | 0 |
| Video Recorder | 15 |
| Email | 20 |
| SMS | 40 |
| MMS | 0 |
| Social Network | 0 |

| | Camera | Voice Recorder | Video Recorder | Email | SMS | MMS | Social Network |
|---|---|---|---|---|---|---|---|
| Camera | 1 | 0.2 | 0.6 | 0.3 | 0.2 | 0.6 | 0.7 |
| Voice Recorder | 0.2 | 1 | 0.3 | 0 | 0 | 0.2 | 0.2 |
| Video Recorder | 0.6 | 0.3 | 1 | 0.1 | 0 | 0.5 | 0.8 |
| Email | 0.3 | 0 | 0.1 | 1 | 0.4 | 0.4 | 0.3 |
| SMS | 0.2 | 0 | 0 | 0.4 | 1 | 1 | 0.7 |
| MMS | 0.6 | 0.2 | 0.5 | 0.4 | 0.6 | 1 | 0.6 |
| Social Network | 0.7 | 0.2 | 0.8 | 0.3 | 0.7 | 0.6 | 1 |

| | Camera | Voice Recorder | Video Recorder | Email | SMS | MMS | Social Network |
|---|---|---|---|---|---|---|---|
| Camera | 20 | 4 | 12 | 3.6 | 4 | 12 | 14 |
| Voice Recorder | 0 | 0 | 0 | 0 | 0 | 0 | 0 |
| Video Recorder | 9 | 4.5 | 15 | 1.5 | 0 | 7.5 | 12 |
| Email | 6 | 0 | 2 | 20 | 8 | 8 | 6 |
| SMS | 8 | 0 | 0 | 16 | 40 | 24 | 28 |
| MMS | 0 | 0 | 0 | 0 | 0 | 0 | 0 |
| Social Network | 0 | 0 | 0 | 0 | 0 | 0 | 0 |
| Affinity Value | 43 | 8.5 | 29 | 41.1 | 52 | 51.5 | 60 |

METHOD AND APPARATUS FOR CUSTOMIZING A USER INTERFACE MENU

FIELD OF THE INVENTION

The present invention relates generally to providing a method and apparatus for customizing a user interface menu based upon the past and current user activity.

BACKGROUND

Wireless communication technologies have seen explosive growth over the past few years. This growth has been fueled by wireless services providing freedom of movement to the mobile public, and cutting the tether to hardwired communication systems. As mobile communication devices have become ubiquitous, an overwhelming number of applications and features have been developed for use on mobile devices. Many of these applications and/or features are pre-loaded on the mobile device and offered to the user through the user interface menu. The user interface menu, being a concise display of available applications/features, is often truncated to display only a sampling of the available applications/features.

However, as the number and complexity of the applications and/or features increase, their setup, capabilities and general usage can become quite baffling to many users. Given the limited space available in mobile device displays, there is simply not enough room to display all of the available applications/features to users in the user interface menu. Many times a series of complex navigation maneuvers must be performed to access a particular application/feature. As a result, many potentially desirable applications/features are either undiscovered or rarely used. Consequently, a user may not receive the full experience offered by the mobile device.

SUMMARY

The various embodiments provide methods and a mobile device which monitors a user's activity on the mobile device, maps the user's activity record to other applications/features available to the user on the mobile device, and provides suggestions to the user regarding the other applications/features (e.g., undiscovered or rarely used applications/features) already available to the user on the mobile device based upon the user's activity record. Upon receiving the suggestions, the user may elect to modify the user interface menu to highlight or include the suggested application/features for future use. In an embodiment, the identity of an application/feature and number of times a user activates the application/feature may be recorded. The frequency of use of a particular application/feature may be calculated. An affinity table may be used to estimate a user's potential interest in an application/feature based upon the user's record of use of another application/feature. The affinity table may be used to calculate relative values of the user's potential interest in applications/features note currently listed or displayed on the user interface menu. The applications/features having the highest relative values may be displayed to the user as a suggestion to add to or modify the user interface menu. In another embodiment, the affinity table may be modified to reflect the user's actions subsequent to the displayed suggestion. In another embodiment, a user's previously created activity record may be transferred from a first mobile device to a second mobile device in order to present suggestions to modify the second mobile device's user interface menu so that it may be similar to that of the first mobile device. In yet another embodiment, the modified affinity table may also be transferred from the first mobile device to the second mobile device in order to present suggestions to modify the second mobile device's user interface menu so that it may be similar to that of the first mobile device.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 3 is an example of a user activity record.

FIG. 5 is an example of an affinity table that may be used by an embodiment method to map a user activity record to other available applications/features on a mobile device.

FIG. 6A illustrates an example of affinity values that may be calculated by an embodiment method to map a user activity record to other available applications/features on a mobile device.

DETAILED DESCRIPTION

Figure 1:
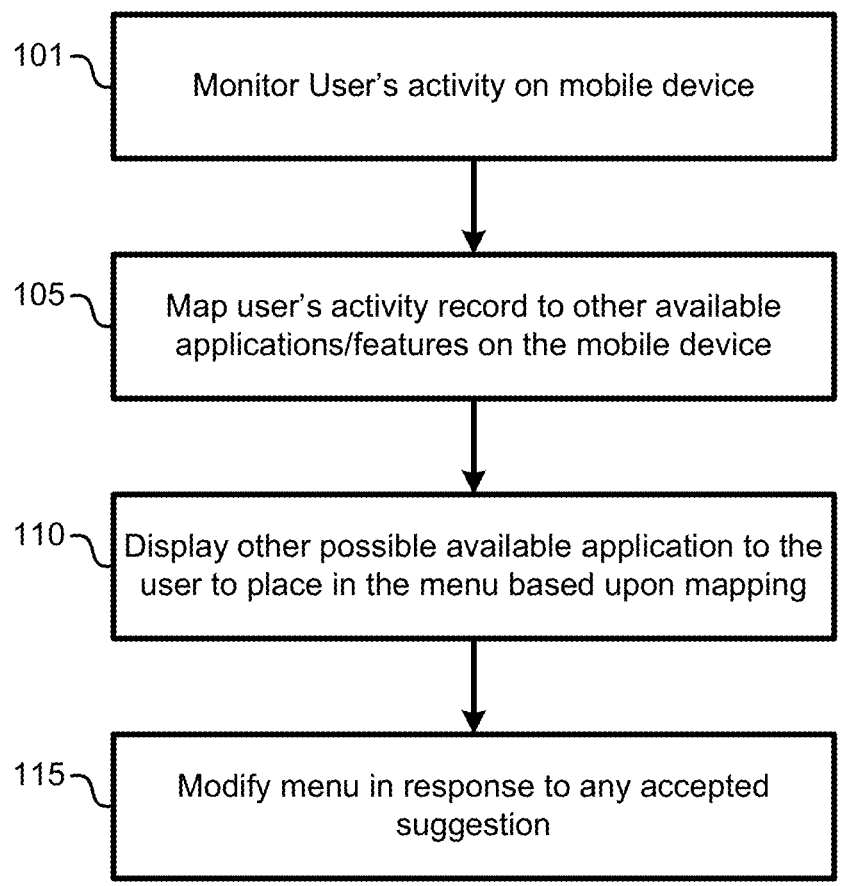
FIG. 1 is a process flow diagram of an embodiment user interface menu customization method that may be implemented by a mobile device.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device" refers to any one or all of cellular telephones, personal data assistants (PDA's), palm-top computers, lap-top computers, wireless electronic mail receivers (e.g., the Blackberry® and Treo® devices), multimedia Internet enabled cellular telephones (e.g., the Blackberry Storm®), Global Positioning System (GPS) receivers, wireless gaming controllers, and similar personal electronic devices which include a programmable processor and memory.

As the popularity of mobile communication devices has increased, so have the complexity of these devices. Today's mobile devices do not simply serve to support cellular telephone communications. Rather, today's mobile devices have become a sophisticated computing platform from which a dizzying array of applications may be executed and features utilized. Most current mobile devices come pre-programmed with a wide variety of applications while providing the user with the capability to customize the applications executable on the mobile device by loading additional "after-market" applications onto the mobile device. Moreover, most current mobile devices contain a number of features that allow users to perform a broad scope of actions. For example, many mobile devices come equipped with cameras that allow the user to take still photos as well as moving video. In addition, many mobile devices come equipped with the ability to record sound. Still further, integrated GPS receivers are becoming commonplace in mobile devices which allow the mobile device to determine its position in the world with precision and accuracy.

In order to present the various application and features options to the user of the mobile device, most mobile devices implement a user interface menu. The user interface menu may be a convenient display of the applications and features available on the mobile device. Typically, by selecting an icon or listing of one of the applications or features, the selected application or feature is launched. However, to enable their portability, many mobile devices employ displays of limited size. Consequently, in many instances the user interface menu (or at least a top page of a user interface menu) lists a limited number of the available functions/applications. In most cases, only the most frequently used applications are displayed.

Despite the wide variety of applications/features available on mobile devices, many users fall into a routine of using a relatively small set of familiar available applications and/or features on their mobile devices. In some cases, the applications/features utilized by the user are the only features that the user has become familiar with through repeated use. As users upgrade and replace older mobile devices with newer ones loaded with advanced applications and/or features, the user may not take advantage of these new applications and/or features because the user is unaware or unfamiliar with them. As a result, many users fail to receive the full benefits offered by their mobile devices. In many instances, users need simply to be made aware or reminded of the availability of unused applications/features to enable them to take fuller advantage of their mobile devices. By identifying or highlighting unused applications/features in a main user interface menu, users may be prompted to utilize a new or rarely used application/feature.

Additionally, while users frequently upgrade and replace older mobile devices with newer ones, there is a limited amount of data that is transferred to new mobile devices. Typically, users transfer their contact lists. In many instances, this transfer of contact lists occurs via a physical transfer of a smart card (e.g., SIM card). Some wireless communication network providers will transfer some of a user's personal data from an old mobile device to the new mobile device for a nominal fee. However, the capabilities of such services are often limited. On the whole, a user's settings and preferences are often non transferable between mobile devices. Consequently, any user interface menu modifications or customizations made by the user on an older device are often not transferred to the new mobile device.

The various embodiments raise a user's attention to additional applications/features readily available on the user's mobile device that the user may be interested in using based upon the user's past and/or current activity on the mobile device. By monitoring a user's activity on the mobile device (i.e., the applications and features utilized), the mobile device may be able to suggest other applications/features that the user may not be aware of but might be interested in using based upon the user's established activity record. The suggested applications/features may be identified or highlighted in the user interface main menu to make it easier for the user to discover and use the software application or hardware. Existing user interface menu customization methods typically place shortcuts on the menu to the most frequently used applications/features. While listing commonly used applications/features on the main menu may assist users in finding and launching the applications/features they use most often, such customization methods do not allow the user to discover other applications/features that are likely to be of benefit to the user.

Various embodiments described herein monitor a user's application and feature usage habits and use such information to customize a user interface menu with targeted applications/features that may best suit and possibly enhance the user's utilization of the mobile device and consequently improve their user experience. In various embodiments, the mobile device may be loaded with a matrix of links, affinity tables, fuzzy logic, or learning algorithms which enable a device processor to identify and prioritize relationships between the various applications/features available on the mobile device. Using observed user behavior patterns and the embodiment methods, the mobile device may suggest to users previously unused or unknown applications/features available on their mobile devices which the user may be interested in using without the need for any external resource to generate the suggestion.

Other embodiments allow the user to transfer records of user behavior patterns from one mobile device to another. In this manner, the second mobile device may immediately make suggestions for customizing its user interface menu so that it may appear similar to that of the first mobile device without the need to generate a new user activity record. In an alternative embodiment, modifications to the matrix of links, affinity tables, fuzzy logic, or learning algorithms may be transferred from one mobile device to another in order to present suggestions to modify the second mobile device's user interface menu so that it may appear similar to that of the first mobile device.

FIG. 1 is a process flow diagram illustrating an overview embodiment method for customizing a user interface menu to identify/highlight applications and/or features available to the user on a mobile device based upon the user's activity on the mobile device. A mobile device may monitor the user's activity on a mobile device, step 101. As an example, a mobile device may identify each request to launch or utilize a software application and/or a hardware feature on the mobile device. The mobile device may store a record of these launches or utilization requests in a user activity record data table 301. An example of a user activity record table 301 is shown in FIG. 3 and described in more detail below. In addition to storing the identity of various applications and features used by the user in the user activity record data table 301, the mobile device 10 may store a measure of use of applications, such as the number of times the user launches or utilizes an identified application and/or feature, or a frequency of use or launch of applications or features (e.g., number of uses divided by a unit of time).

Once the user's activity has been observed and recorded, the mobile device 10 may map the user's activity record to other available applications and/or features available on the mobile device 10, step 105. Any of a number of algorithms and methods may be used to map a user's past and current activity to other available applications and/or features available on the mobile device. For example, a matrix of links may be established which link other available applications/features to the applications/features that are already being utilized by the user. As another example, an affinity table may be stored in memory which includes weighting factors that can be used to estimate the likelihood that the user would be interested in using other available applications/features based on the applications/features that are already being used. Other methods such as the use of fuzzy logic or learning algorithms may be implemented to map the user's activity record to other available applications and/or features available on the mobile device 10 in step 105.

Once the user's activity record has been mapped to other applications/features available on the mobile device, the mobile device 10 may display the other applications/features that are most likely to be of benefit to the user based upon the user's activity record, step 110. This display of other applications/features available on the mobile device 10 may be made as a suggestion to modify the user interface menu to include other recommended applications/features. If the user elects to accept the suggested modification, the user interface menu may be modified to reflect the accepted suggestions, step 115.

Figure 2:
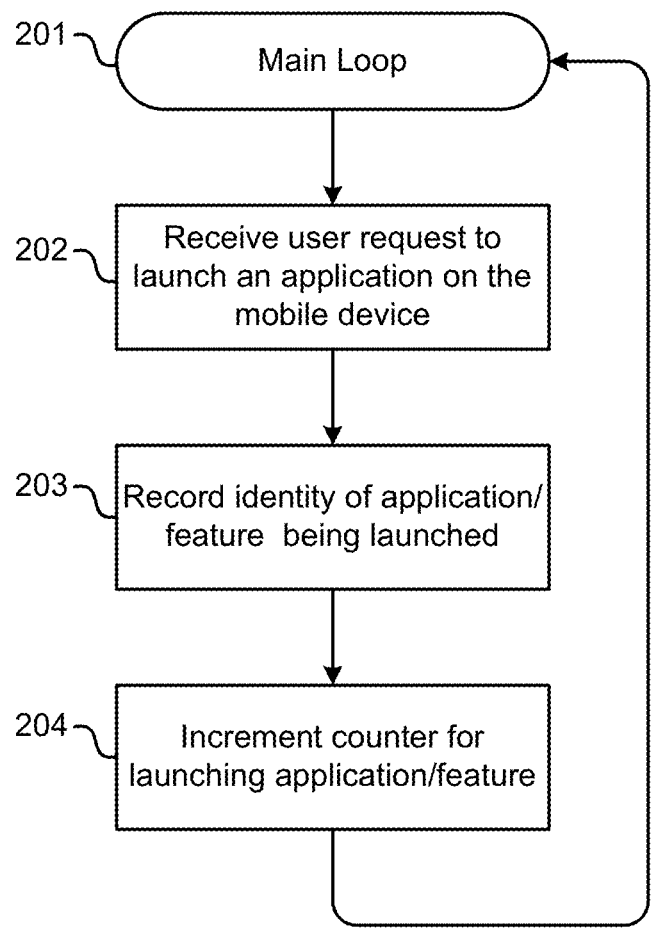
FIG. 2 is a process flow diagram of an embodiment method to generate a user activity record on a mobile device.

FIG. 2 is a process flow diagram of an embodiment method for generating a user activity record on a mobile device. The processor of a mobile device may oversee a number of processes and operations being executed on the mobile device in a main loop routine, step 201. The main loop may comprise a number of subroutines, loops and processes that are executed at various times in the normal operation of the mobile device. When a mobile device user manipulates the user interface to launch an application or utilize a hardware feature on the mobile device an interrupt may be received by the processor to initiate a subroutine to record the user activity, step 202. Upon receipt, in addition to launching the application or initiating operation of the feature, the processor may record the identity of the software application or hardware feature being launched by the user, step 203. In addition, the processor of the mobile device may increment a counter for the launching application or feature which indicates the number of times the application or feature has been launched or used, step 204. Such a usage counter may tally all uses, or alternatively all uses within a unit of time, such as a day, week, month or year to provide a frequency of use metric.

FIG. 3 provides an example of a data table containing a sample of a user activity record that may be stored in the memory of the mobile device. As shown in FIG. 3, a user activity record data table 301 may identify a number of possible software applications and hardware features available to the user on the mobile device along with a measure of the use made of such applications or features. In the example user activity record data table 301 the hardware features include a camera, a voice recorder, and a video recorder, while the available software applications include email, Short Message Service (SMS), Multimedia Message Service (MMS), and a social networking website application. This list of hardware features and software applications is provided merely as an illustration and is not intended to be comprehensive. In addition, a user activity record data table 301 will include a measure of the use of applications and features by the user. The measure of use may be in the form of counter values indicating the number of times the identified application/feature has been launched/used. Alternatively, the measure of use may be in the form of a frequency value (as shown) indicating the number of times the identified application/feature has been launched/used within a unit of time (e.g., day, week, month, year, etc.). In some embodiments, the activity record may periodically decrement the counters in order to reflect the frequency of use (i.e., total number of times the identified application/feature has been launched/used during the refresh period). In other embodiments, the activity record may contain a value indicating the total number of times the identified application/feature has been launched/used for the life of the mobile device. In such embodiments, the processor may calculate the frequency by dividing the counter value by the amount of time that has elapsed since the mobile device was activated.

Figure 4:
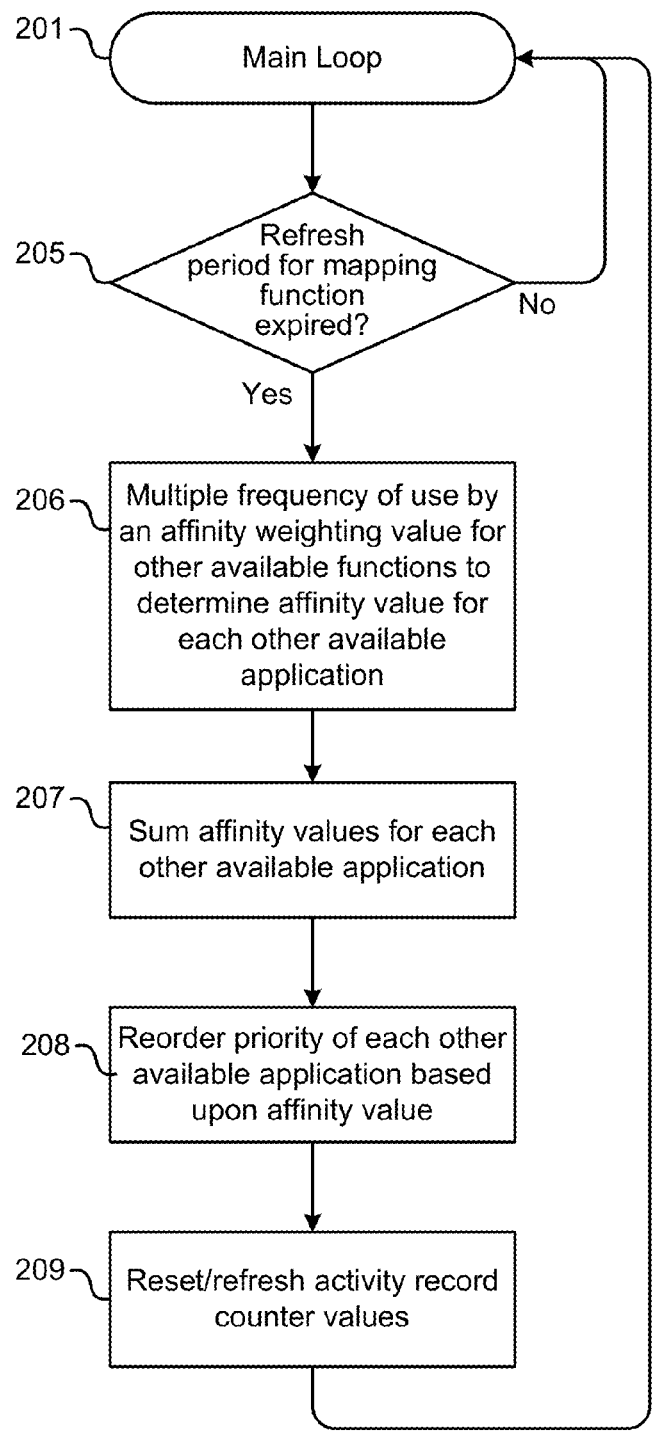
FIG. 4 is a process flow diagram of an embodiment method to map a user activity record to other available applications/features on a mobile device.

Once the user's activity record has been generated, the mobile device 10 may map the user's activity record to other available applications/features on the mobile device in order to provide the user with suggestions of other available applications/features on the mobile device that the user is likely to be interested in based upon the activity record. If accepted, the suggested applications/features may be added to the user interface menu so that these previously unknown or little used applications/features are presented on a priority menu for easy access by a user. FIG. 4 is a process flow diagram illustrating an embodiment method for mapping the user's activity record to other available applications/features on the mobile device. The process flow illustrated in FIG. 4 utilizes an affinity table which may be stored in local memory of the mobile device or accessed in a remote server memory. An example of an affinity table is shown in FIG. 5 and described in more detail below. The process shown in FIG. 4 is described with reference to FIGS. 5, and 6A.

Referring to FIG. 4, while in the main loop routine, step 201, the mobile device processor may periodically check to see if the time to perform a mapping function has elapsed, determination 205. The periodicity of the mapping function may be arbitrarily set by the user, service provider, mobile device manufacturer, or some third party. The length of the time between mapping functions may be chosen to most accurately reflect the user's current behavioral usage patterns. For example, the length of time between mapping functions may be selected to be long enough to collect a minimum threshold of "data points" in the activity record. Additionally, the length of time may be selected such that only the user's more recent activity is reflected in the activity record. If an extraordinarily long period of time is selected, the activity record may not accurately reflect the user's current behavior patterns. For example, if a user launched a particular application repeatedly in the first week following acquisition of the mobile device 10 but never there after, if the length of time between mapping function operations is selected to encompass the first week of activity, the stored activity record may not accurately reflect the user's current behavior patterns.

If the period of time between mapping function has not yet elapsed (i.e., determination 205=No), the processor returns to the main loop routine, step 201. However, if the period of time between mapping functions has elapsed (determination 205=Yes), the processor may multiply the frequency of use for each application/feature recorded in the activity record data table by an affinity weighting factor listed in an affinity table stored in memory to determine an affinity value for each available application/feature, step 206.

An example of an affinity table 302 that may be used with an embodiment is shown in FIG. 5. For each application/feature listed in the first column of the affinity table 302, an affinity weighting factor is provided indicting a relative affinity that a user may have to use the particular application/feature given the user's usage of the application/feature listed in the first column.

The use of the affinity table illustrated in FIG. 5 may be explained by the way of an example, in which the hardware features and software applications include: a camera, a voice recorder, a video recorder, email, SMS, MMS, and a social networking website application (e.g., Facebook®, Twitter®, myspace®). As illustrated in FIG. 5, an affinity table for such a mobile device may include a data record (row) for each of the used applications and features with each data record including a data field (column) for each the possible applications and features. In this example, the use of a particular application or feature is given full weight, so applications/features have an affinity of "1" for themselves. Thus, if the user uses the camera hardware feature, this usage indicates a likelihood that the user will want to use the camera feature again in the future. Thus, the affinity weighting factor for a camera usage stored in the camera data record (i.e., first row and first column) is "1." Other affinity weighting factors may be set by software or services providers as estimates of how likely a user utilizing a first application/feature will be interested in using a second application/feature. In the example shown in FIG. 5, the affinity weighting factor assigned to the voice recorder feature (third column) given uses of the camera feature is 0.2. The affinity weighting factor may be in arbitrary units, but assigning a weighting factor of 0.2 to voice recorder may be viewed as similar to estimating that one who uses the camera feature has a 20% likelihood of being interested in using the voice recorder feature. Further, FIG. 5 shows an affinity weighting factor for the video recorder feature (fourth column) given use of the camera function of 0.6. This affinity weighting factor implies that one who uses the camera feature is three times more likely to use the video recorder feature than the voice recorder feature. The example in FIG. 5 further includes an affinity weighting factor of 0.3 for the email application (fifth column) given use of the camera function, an affinity weighting factor 0.2 for the SMS application (sixth column) given use of the camera function, an affinity weighting factor of 0.6 for the MMS application (seventh column) given use of the camera function, and an affinity weighting factor of 0.7 for the social networking application (eighth column) given use of the camera function. It should be noted that the affinity weighting factors shown in FIG. 5 are completely arbitrary and for illustrative purposes only.

The affinity weighting factors may be provided by any of service providers and based upon a number of information sources. For example, polling services may conduct surveys which ask mobile device users several questions about their mobile device usage, such as "do you use the camera function on your mobile device?" By obtaining information about the different types of applications and features used by the general population, patterns may be detected regarding common application/feature usages. For example, surveys may reveal that users who use camera features are likely to also use a video recorder feature and an MMS software application. Similarly, surveys may reveal that users who send text messages are also likely to use social networking application. Based on the survey data, affinity weighting factors may be generated and stored in a table such as affinity table 302 reflecting such cross-application usage patterns. The affinity weighting factor thus can provide a relative measure of the likelihood that a user will enjoy, benefit from, or use application/feature X given that the user uses application/feature Y.

It is noted that the illustrative affinity table 302 is symmetrical in that the affinity weighting factor of application/function X given application/function Y is the same as the affinity weighting factor of application/function Y given application/function X. However, this is for illustrative purposes only and affinity tables may also be asymmetrical. An asymmetrical affinity table would be appropriate if survey data indicates that the likelihood of a user using application/feature X given use of application/feature Y is not the same as the likelihood of a user using application/feature Y given use of application/feature X. For example, survey results may reveal that users who send MMS messages may not be particularly likely to use a camera feature, but those users who do use the camera feature are quite likely to also use an MMS software application.

In addition, as shown in the example affinity table 302 in FIG. 5, there may be no affinity among some application/feature pairings. For example, in row 2, column 5, the affinity weighting factor reflecting whether a user who uses the email application is likely to use the camera feature is zero (0). This example affinity weighting factor reflects a conclusion that email usage has little if any relationship to camera usage.

Referring back to FIG. 4, by multiplying the frequency that a user uses a particular application/function by the affinity weighting factors listed in an affinity table 302 for that particular application/function, affinity values can be obtained for each applications/functions addressed in the table, step 206. Such affinity values will reflect a relative likelihood that the user may be interested in the other applications/functions based upon the use of the particular application/function. Using all of the usage frequency values listed in the user activity record data table 301 and the affinity weighting factors listed in an affinity table 302, total affinity values may be calculated. For example, using the data illustrated in FIGS. 3 and 5, an affinity value for the camera feature given use of the camera is 20 (i.e., 20.times.1=20), an affinity value for the voice recorder feature given use of the camera is 4 (i.e., 20.times.0.2=4), and an affinity value for the video recorder feature given use of the camera is 12 (20.times.0.6=12). Other affinity values based on the data illustrated in FIGS. 3 and 5 are listed in an affinity value summing table 303 shown in FIG. 6A.

Referring back to FIG. 4, when the affinity values for every application/feature available on the mobile device are calculated based upon the activity record table and the affinity table, the affinity values for each application/feature may be summed to provide a total or overall affinity value, step 207. An example of such calculations is shown in the affinity value summing table 303 in FIG. 6A. By adding each affinity value for a particular application/feature (i.e., adding each affinity value in a column of affinity value summing table 303), an overall relative affinity value can be obtained that reflects the relative likelihood that the user will be interested in a particular application or feature given the user's overall mobile device usages. Summing also takes into account multiple variant information, such as the likelihood of use of social networking applications given use of the camera feature and SMS and MMS applications. In other words, the summed affinity values provide an estimate of the relative likelihood that a user may use or benefit from a particular application or feature based upon the user's on-going usage of all other applications/features.

FIG. 6A further illustrates that by completing all of the affinity value calculations, an overall ranking of applications/features can be obtained as shown in the bottom row of affinity value summing table 303. For example, using the example user activity record data table 301 and affinity table 302, shown in FIGS. 3 and 5, the camera feature exhibits a total affinity value of 43, the voice recorder feature exhibits a total affinity value of 8.5, video recorder feature exhibits a total affinity value of 29, the email application feature exhibits a total affinity value of 41.1, the SMS application feature exhibits a total affinity value of 52, the MMS application feature exhibits a total affinity value of 51.5 and the social networking application feature exhibits a total affinity value of 60.

FIG. 6A illustrates an important benefit provided by the various embodiments which is identifying unused applications or features that the user might find interesting. Referring back to FIG. 3 it can be seen that the user in this example never sends MMS messages or launches a social networking application. However, the total affinity values for these applications shown in FIG. 6A indicates that, based upon the user's over all activities, which include use of the camera, video recorder, email and SMS, the user is likely to benefit from MMS and social networking applications.

It should be noted that the data table of FIG. 6A is for illustrative purposes only and does not reflect a particular user, implementation or required aspect. The affinity value summing table 303 illustrates calculated affinity values and the total affinity values, but these values need not be stored in memory.

Referring back to FIG. 4, the mobile device processor may reorder the priority of each application/feature available on the mobile device according to the summed affinity values, step 208. Thus, the application/feature having the highest summed affinity value may be deemed to be the application/feature most likely to be of benefit to the user based upon the user's activity record. Using the illustrative summed affinity values appearing in the affinity value summing table 303 shown in FIG. 6A, the mobile device processor may determine that the user will most likely use (benefit from use of) the social networking application followed by the SMS application, the MMS application, the camera function, the email application, the video recorder function, and finally, if there are sufficient lines in the user interface menu, the voice recorder function. As noted above, the social networking application and MMS application are included in the user interface menu based solely on the affinity calculations, and not based upon prior usage. Thus, these applications are listed high in the user menu order since they appear to be of interest to the user based on the user's overall mobile device usage pattern, even though the user has not utilized those applications in the past. Some or all of the reordered priority list may be displayed to the user on the mobile device as suggestions to add the highest priority application/features to the user interface menu (see FIG. 1, step 110). Once the priority of each of the available applications/features has been generated, in embodiments where the activity record counter values are reset/refreshed, the mobile device processor may reset or refresh the activity record counter values, step 209. The mobile device 10 may then return to the main loop routine, step 201 until the next period for performing the mapping function has elapsed.

Figures 6B, 6C:
FIG. 6B illustrates an example of affinity values that may be calculated by an embodiment method to map a user activity record to other available applications/features on a mobile device.
FIG. 6C illustrates an example of affinity values that may be calculated by an embodiment method to map a user activity record to other available applications/features on a mobile device.

As noted earlier, the total affinity value summing table 303 need not be generated for storage in memory. In alternative embodiments, the mobile device processor may calculate the affinity values and sum them in a single algorithm calculation without storing a table of affinity values. FIGS. 6B and 6C illustrate alternative data tables which may be generated containing only the total affinity values in a data table 304 shown in FIG. 6B, or values indicative of the priority of each application/feature in a data table 305 shown in FIG. 6C based upon the overall affinity values.

While the embodiment method illustrated in FIG. 4 utilizes an affinity table to determine a relative ranking of applications and features based upon a user activity record, other methods for mapping the user activity record to applications and features may be utilized. For example, instead of multiplying activity values times and affinity weighting factor, application links may be determined using a matrix of links. The total number of links for each application or feature may then be used to develop a relative ranking of applications and features. As another example, instead of reflecting survey results in affinity weighting factors, inferences and patterns obtained from user surveys may be translated into fuzzy logic factors that can be applied to the user activity record in order to develop the relative ranking of applications and features. As a further example, inferences and patterns obtained from user surveys may be translated into learning algorithms which may be applied to the user activity record in order to develop the relative ranking of applications and features.

Figure 7A:
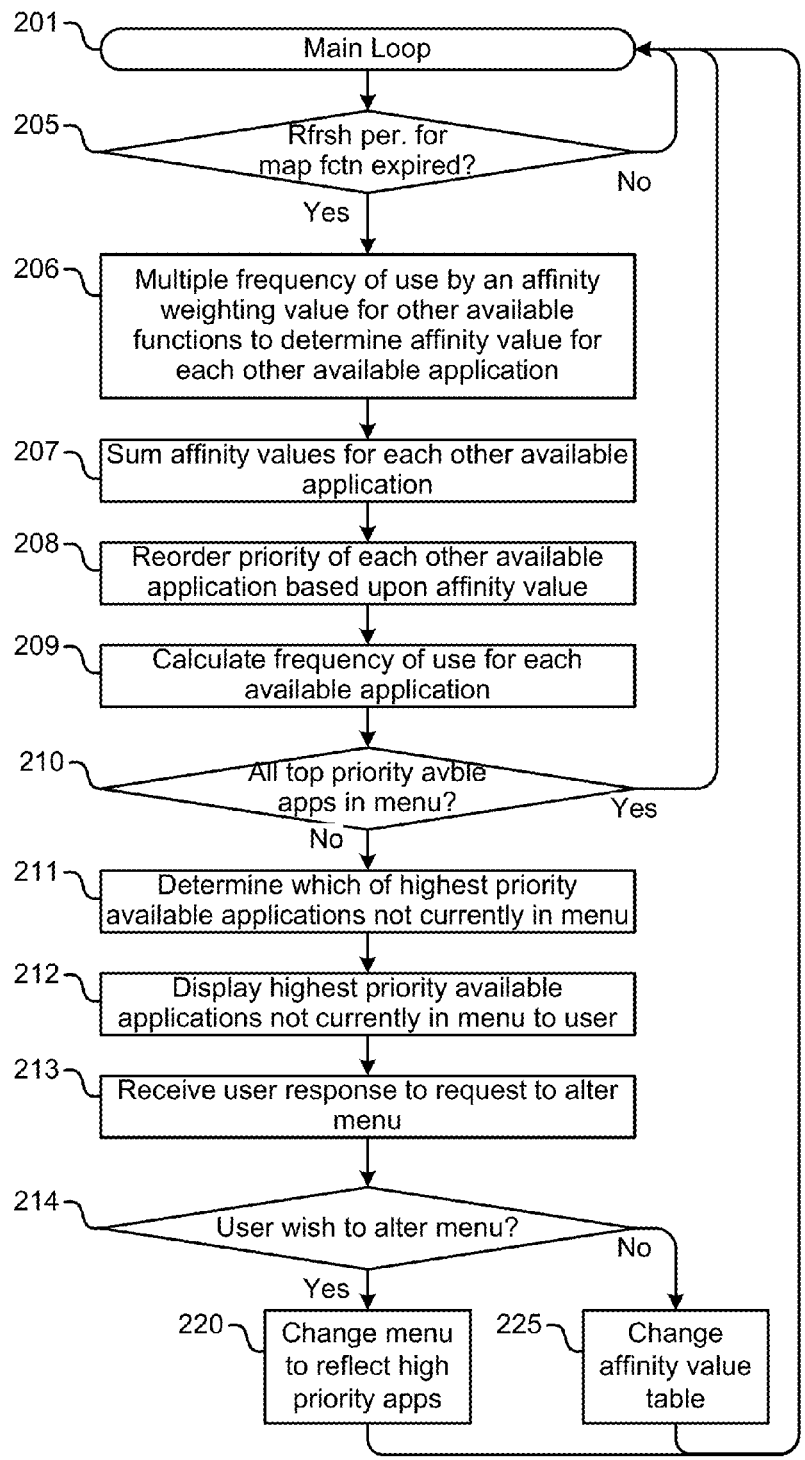
FIG. 7A is a process flow diagram illustrating an embodiment method to customize a user interface menu based upon a user activity record.

FIG. 7A is a process flow diagram illustrating an embodiment method for customizing a user interface menu based upon a user activity record. The embodiment method illustrated in FIG. 7A makes use of the activity record generation process described above with reference to FIG. 2 and the mapping process described above with reference to FIG. 4. Thus, for example, the mobile device processor may perform the process flow shown in FIG. 2 to generate a user activity record data table 301 similar to that illustrated in FIG. 3. Concurrently with or subsequent to generating the user activity record data table 301, the mobile device 10 processor may perform the example method illustrated in FIG. 7A. As discussed in more detail above with reference to FIG. 4, the mobile device 10 processor may determine whether it is time to perform a mapping process, determination 205. If the time to perform the mapping process has elapsed (i.e., determination 205=Yes), the mobile device processor may perform steps 206-209 in a manner similar to that described above with reference to FIGS. 4, 5, and 6A-6C. Once the priority of each available applications/features has been determined based upon the summed affinity values, step 209, the mobile device processor may determine whether the top priority applications/features are already displayed in the user interface menu, determination 210.

As noted above, due to display size constraints and other factors, the user interface menu may not display or list all of the software applications or hardware features (at least on a top page of the user interface menu). In many instances, links or shortcuts to only a fraction of available application/features will be included in the user interface menu. Accordingly, a mobile device processor may compare the top priority applications/features determined during the re-ordering step with those currently displayed in the user interface menu to determine if suggestions should be made to the user to modify the user interface menu.

If all of the top priority applications are already displayed in the user interface menu (determination 210=Yes), there is no need to present suggestions to the user to modify the user interface menu, so the mobile device processor may return to the main loop routine, step 201. However, if any, all or some of the top priority application/features are not currently displayed in the user interface menu (i.e., determination 210=No), the mobile device processor may determine which of the top priority application/features is (are) not currently displayed in the user interface menu, step 211. The mobile device 10 processor may then display one or more suggestions or requests to add each of the top priority application(s)/feature(s) that are not currently included in the user interface menu as to the user interface menu, step 212. The mobile device 10 processor may wait for and receive the user's response to the suggestion to modify the user interface menu, step 213. If the received user response indicates acceptance of at least one of the suggestions to modify the user interface menu (i.e., determination 214=Yes), the mobile device processor may modify the user interface menu to display each of the top priority application/features in the user interface menu accepted by the user, and remove one or more non-top priority application/features from the user interface menu, step 220. Once the user interface menu has been modified, the mobile device processor may return to the main loop routine, step 201 until it is again time to perform the mapping process elapses.

If, however, the user's response to the suggestion indicates a rejection of the displayed suggestion to modify the user interface menu (i.e., determination 214=No), the mobile device processor may alter the affinity weighting factors stored in the affinity table 302, step 225. The user's rejection of a suggestion to modify the user interface menu may indicate that the user is not interested in and therefore will not use the suggested application or feature. Since the initial affinity weighting factors may be arbitrary or based upon a general population survey that is not applicable to the particular user, a user's response to a suggestion to modify the user interface menu may provide further insight into the user's usage patterns which can be used to refine the affinity weighting factors for the specific user. For example, upon implementation of the embodiment method illustrated in FIG. 7A, the mobile device processor may present a suggestion to the user to replace the email application with the social networking application on the user interface menu. In response the user may reject this suggestion. This rejection may be an indication that, unlike many other users, this particular user has no interest in social networking. Accordingly, for this particular user the affinity weighting factors for the social networking application maybe decreased or set to zero. Modifying the affinity weighting factors in this manner reduces the likelihood that the mobile device processor will issue a suggestion to add the social networking application in the future. In alternative embodiments, the affinity weighting factors may be manually adjusted by the user, such as in the form of a preference setting, to increase or decrease their value, thereby increasing or decreasing the likelihood that that application/feature will be suggested by the mobile device processor to be added to the user interface menu in the future. Once the modified affinity weighting factors are stored in the affinity table 302, the mobile device processor may return to the main loop routine, step 201, until the next time to perform the mapping process elapses.

Figure 7B:
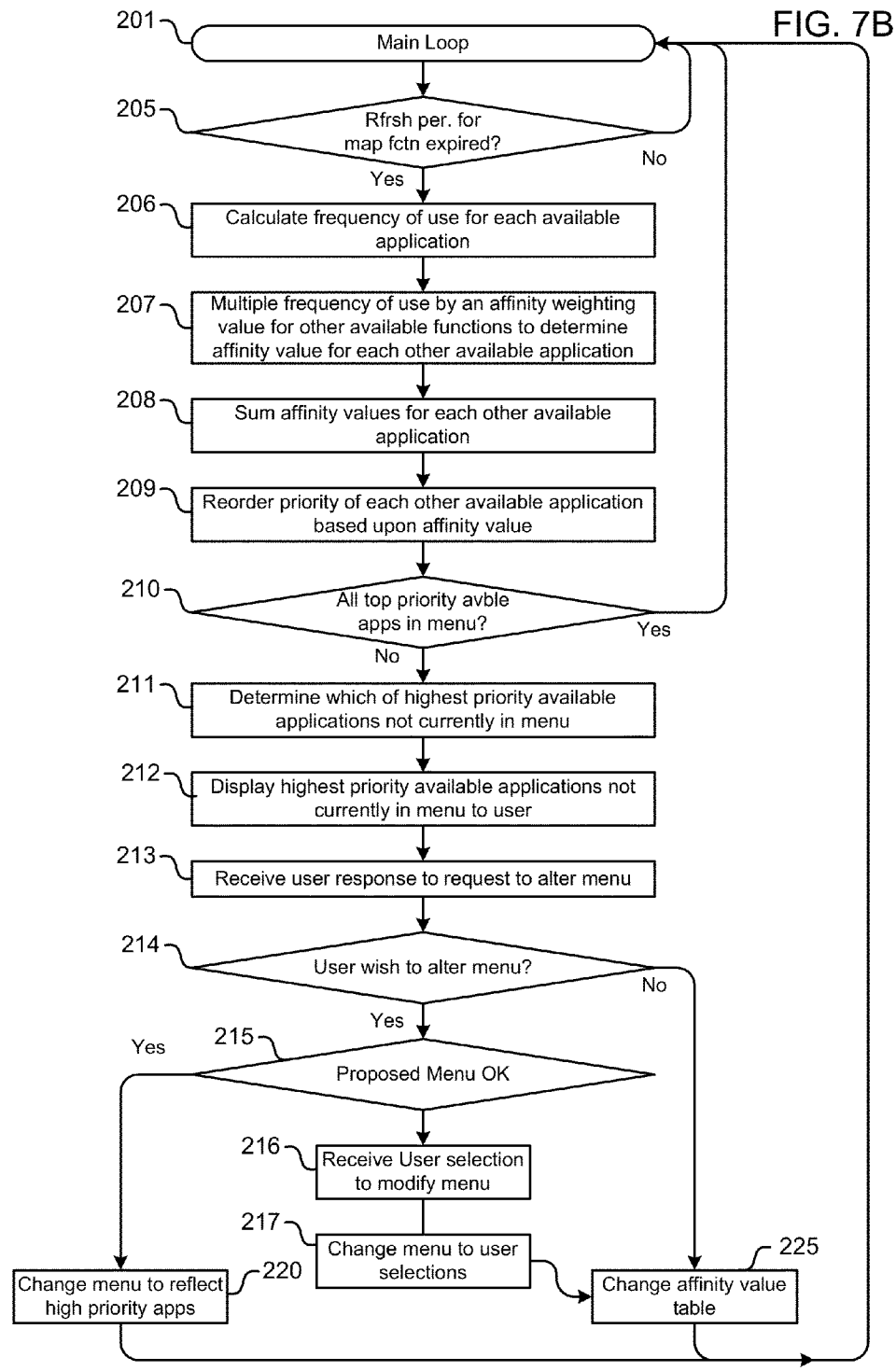
FIG. 7B is a process flow diagram illustrating an alternative embodiment method to customize a user interface menu based upon a user activity record.

FIG. 7B is a process flow diagram illustrating an alternative embodiment method for customizing a user interface menu based upon a user activity record. The embodiment method illustrated in FIG. 7B is similar to that shown in FIG. 7A and thus, the descriptions of steps 201-214 above apply as well to FIG. 7B. In contrast to the embodiment method illustrated in FIG. 7A, if the user accepts the suggestion to modify the user interface menu (i.e., determination 214=Yes), the mobile device processor may prompt the user to indicate whether the proposed modifications to the user interface menu are satisfactory, decision 215. For example, the mobile device processor may reorder all available applications/features on the mobile device in accordance with step 209 and the summed affinity values. If the top priority applications/features include at least one application/feature not previously displayed in the user interface menu, at least one application/feature previously displayed in the user interface menu may be replaced by a higher priority application feature. Logically, the application/feature with the lowest summed affinity value may be chosen for replacement by the mobile device processor. However, the user may wish to accept the mobile device processor's suggestion to add an application/feature to the user interface menu, but disagree with the suggested application/feature to be removed from the user interface menu. In other instances, the mobile device processor may suggest replacing multiple applications/features with multiple applications/features. It may be the case that the user only agrees to accept one or some of the suggested application/feature replacement. Still further, the user may wish to modify the user interface menu, but rather than replace applications/features with those suggested by the mobile device 10 processor, the user may prefer to add and delete a different set of applications/features. If the suggested user interface menu (e.g., replacing lowest a summed affinity value application/feature with a suggested application/feature) is accepted by the user (i.e., decision 215=Yes), the mobile device processor may modify the user interface menu similar to step 220 described above. However, if the proposed user interface menu is rejected by the user (i.e., decision 215=No), the mobile device 10 processor may receive the user's input of applications or features to add to and deleted from the user interface menu, step 216, and make the appropriate changes to the user interface menu, step 217. In addition, user's selection of applications/features to add to and delete from the user interface menu may be used to modify the affinity values in the affinity table 302, step 225. As discussed above, if the user rejects a suggestion to add an application or feature, this user input may indicate that the affinity values are not properly calibrated to the particular user's desires. To correct the situation, the mobile device processor may modify the affinity weighting factors in the affinity table by decreasing or zeroing the affinity weighting factors for the suggested but not accepted application/feature may need change. In contrast, if the user elects to add an application/feature that was not suggested by the mobile device processor, this addition may indicate a need to increase the affinity weighting factors for the elected application/feature. In this manner, the implementation of the mapping functions shown in FIGS. 4, 7a, and 7B may result in a higher likelihood that the elected application/feature will be suggested by the mobile device processor in the future.

Users often replace their mobile devices. When doing so, the user may wish to transfer the user's customized user interface menu from the old mobile device to the new one. If the user interface menu appearing on a user's previous mobile device was generated and modified based on the user's behavioral patterns according to the various embodiments, to obtain the same customized user interface, the user may be required to replicate his behavior on the new mobile device. This may be time consuming if the user had used the earlier mobile device for a long time. By transferring the user's activity record from the mobile device to the replacement device, the user may be able to insure a seamless transition of the user interface menu from one mobile device to another. Alternatively, if a second user appreciates the customized user interface menu appearing on the first user's mobile device and desires to obtain the same customized user interface menu on the second user's mobile device, the second user may receive and load the first user's activity record into the second user's mobile device. In this manner, a subsequent implementation of an embodiment method, such as the embodiment illustrated in FIG. 7A, will result in a similar customized user interface menu.

The activity record may be transferred from one device to another in any of a variety of methods. For example, the activity record may be saved to a portable SIM card that is physically transferred from one device to another. Alternatively, the activity record data may be downloaded via a wired or wireless connection using any wireless communication protocols and technologies (e.g., 802.11, Bluetooth, Zigbee, near field communications, infrared transmission, etc.). In addition, a user's activity record appearing on a first mobile device may be uploaded to a remote storage site, such as the memory of a remote server, and accessed by a second mobile device via direct link or network link (e.g., private intranet or public Internet) to download the activity record into the second mobile device.

Figure 8A:
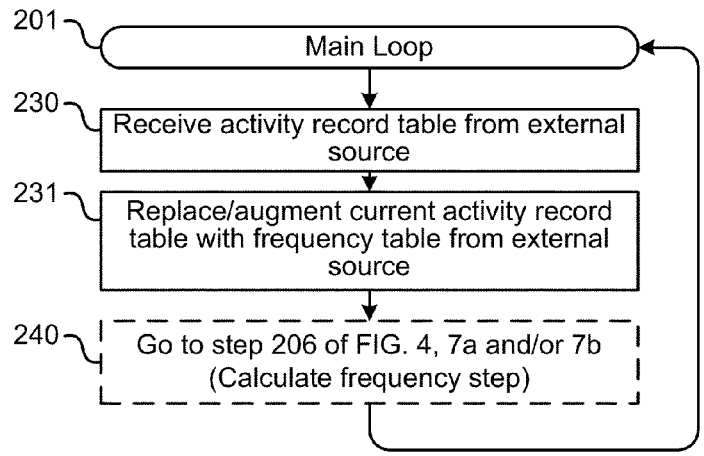
FIG. 8A is a process flow diagram illustrating an embodiment method to transfer a user activity record to a mobile device.

FIG. 8a illustrates an embodiment method by which a second (replacement) mobile device can obtain a customized user interface menu similar to the user interface menu implemented on a first mobile device. While performing a main loop routine, step 201, a second mobile device processor may receive an activity record table from an external source, step 230. The external source may be the first mobile device or an external storage storing the activity record table such as a remote server memory. The second mobile device processor may then replace or augment the activity record data table currently stored in the second mobile device memory, step 231. For example, the activity record in the second mobile device may have additional applications/features not previously identified in the first mobile device activity record. Thus, the activity record table stored in the second mobile device may be used to augment the currently stored activity record by adding counter values or usage frequency information for each identified application/feature to the values for the corresponding application/feature stored in the second mobile device activity record. In addition, if any application/feature is identified in the first mobile device activity record that does not appear in the second device activity record, the identified application/feature may be added to the second mobile device activity record. This may occur when a particular application/feature has been modified or replaced by a newer application/feature or may simply be obsolete (e.g., infrared data transfer). Once the activity record table in the second mobile device has been replaced or augmented, the second mobile device processor may optionally implement a process to modify the user interface menu (such as by performing step 206 in FIGS. 4, 7A, and 7B), step 240. Alternatively, the second mobile device processor may simply return to the main loop routine, step 201 and wait until the time to perform the mapping function process elapses.

Figure 8B:
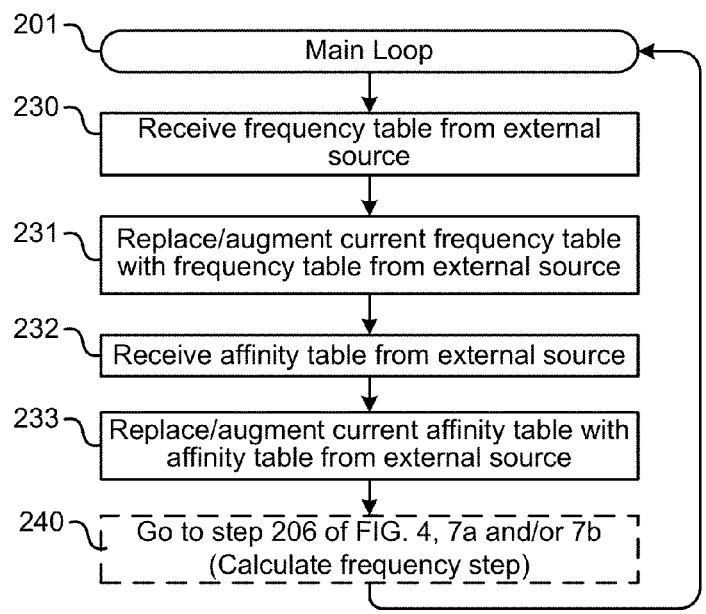
FIG. 8B is a process flow diagram illustrating an embodiment method to transfer a user activity record and dynamically modified affinity table to a mobile device.

FIG. 8B illustrates an alternative embodiment method for customizing a second mobile device's user interface menu to be similar to that of a first mobile device. Similar to the process flow illustrated in FIG. 8A, the second mobile device processor may perform a main loop routine, step 201 and receive an activity record table from a first mobile device (either directly or indirectly), step 230. The second mobile device processor may replace or augment the activity record data table stored in the second mobile device, step 231. Since, the customized user interface menu implemented in the first mobile device may be the result of both the user's activity record and modifications made to the affinity weighting factors stored in an affinity table 302, the second mobile device processor may also receive modified affinity weighting factors from the first mobile device, step 232. Once modified affinity weighting factors are received, the second mobile device processor may replace or augment the affinity table 302 stored in memory of the second mobile device with the affinity weighting factors received from the first mobile device), step 233. Once the activity record table in the second mobile device has been replaced or augmented, the second mobile device processor may optionally immediately implement a process to modify the user interface menu (such as by implementing step 206 described above with reference to FIGS. 4, 7A, and 7B), step 240. Alternatively, the second mobile device processor may simply return to the main loop routine, step 201, and wait until it is again time to perform the mapping function process.

Figure 8C:
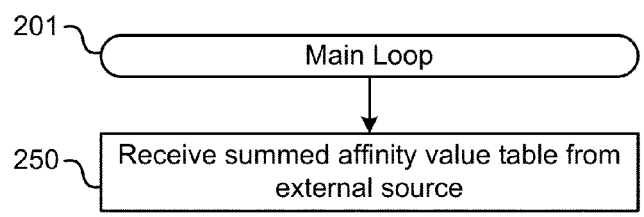
FIG. 8C is a process flow diagram illustrating an embodiment method to transfer affinity values to a mobile device.

FIG. 8C illustrates yet another embodiment method for customizing a second mobile device's user interface menu to be similar to that of a first mobile device. In this alternative embodiment, rather than migrating the activity record and/or affinity table, the summed affinity value table may be migrated from the first mobile device to the second mobile device. Thus, while the second mobile device processor is performing the main loop routine, step 201, it may receive the summed affinity value table (e.g., tables 303, 304 or 305) from a first mobile device, step 250. By migrating the summed affinity value table (303, 304, 305) to the second mobile device, the second mobile device processor may simply compare the top priority application/features identified in the received summed affinity value table with the applications/features currently displayed in the second mobile device user interface menu, step 208 in FIG. 4. The second mobile device processor may then replace the user interface menu displayed on the second mobile device such that the top priority application/features identified in the received summed affinity value table are now displayed in the user interface menu, step 209 in FIG. 4. Alternatively, the second mobile device processor may compare the top priority applications/features identified in the received summed affinity value table to determine if the second mobile device processor should suggest to replace applications/features currently displayed user interface menu with top priority applications/features identified in the received summed affinity value table, steps 211-220 in FIGS. 7A and 7B.

Figure 9:
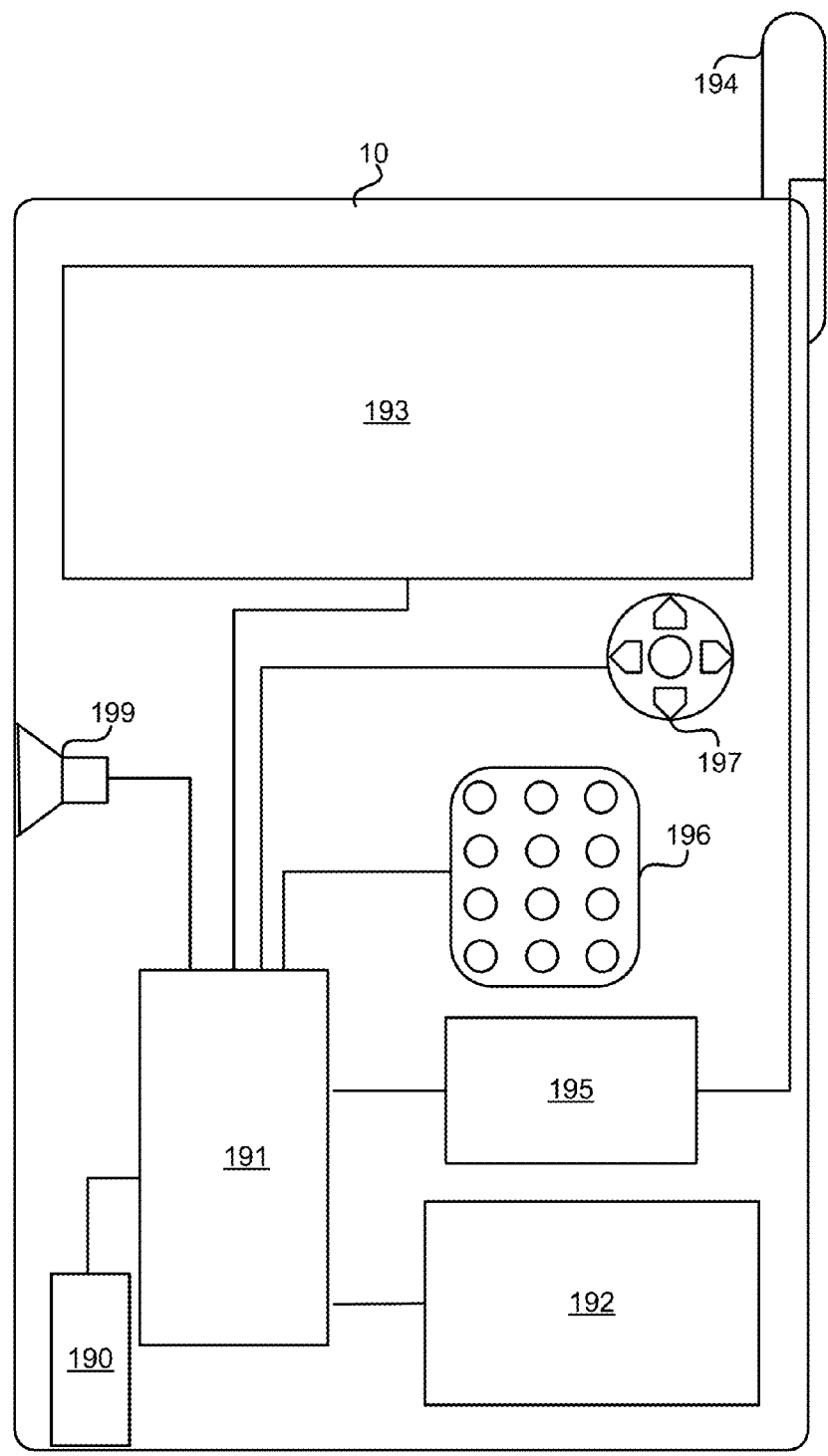
FIG. 9 is a component block diagram of a mobile device suitable for use in an embodiment.

Typical mobile devices suitable for use with the various embodiments will have in common the components illustrated in FIG. 9. For example, an exemplary mobile device 10 may include a processor 191 coupled to internal memory 192, a display 193, and to a speaker 199. Additionally, the mobile device 10 may have an antenna 194 for sending and receiving electromagnetic radiation that is connected to a wireless data link and/or cellular telephone transceiver 195 coupled to the processor 191. In some implementations, the transceiver 195 and portions of the processor 191 and memory 192 used for cellular telephone communications are collectively referred to as the air interface since it provides a data interface via a wireless data link. Mobile devices typically also include a key pad 196 or miniature keyboard and menu selection buttons or rocker switches 197 for receiving user inputs.

The processor 191 may be any programmable microprocessor, microcomputer or multiple processor chip or chips that can be configured by software instructions (applications) to perform a variety of functions, including the functions of the various embodiments described herein. In some mobile devices, multiple processors 191 may be provided, such as one processor dedicated to wireless communication functions and one processor dedicated to running other applications. Typically, software applications may be stored in the internal memory 192 before they are accessed and loaded into the processor 191. In some mobile devices, the processor 191 may include internal memory sufficient to store the application software instructions. The mobile device 10 may also include a separate memory chip 190 such as smart card for storing data such as the user activity record and a table of affinity weighting factors. In some mobile devices, the secure memory may be in a separate memory chip coupled to the processor 191. In many mobile devices 10, the internal memory 192 may be a volatile or nonvolatile memory, such as flash memory, or a mixture of both. For the purposes of this description, a general reference to memory refers to all memory accessible by the processor 191, including internal memory 192, the memory chip 190, removable memory plugged into the mobile device, and memory within the processor 191 itself.

Figure 10:
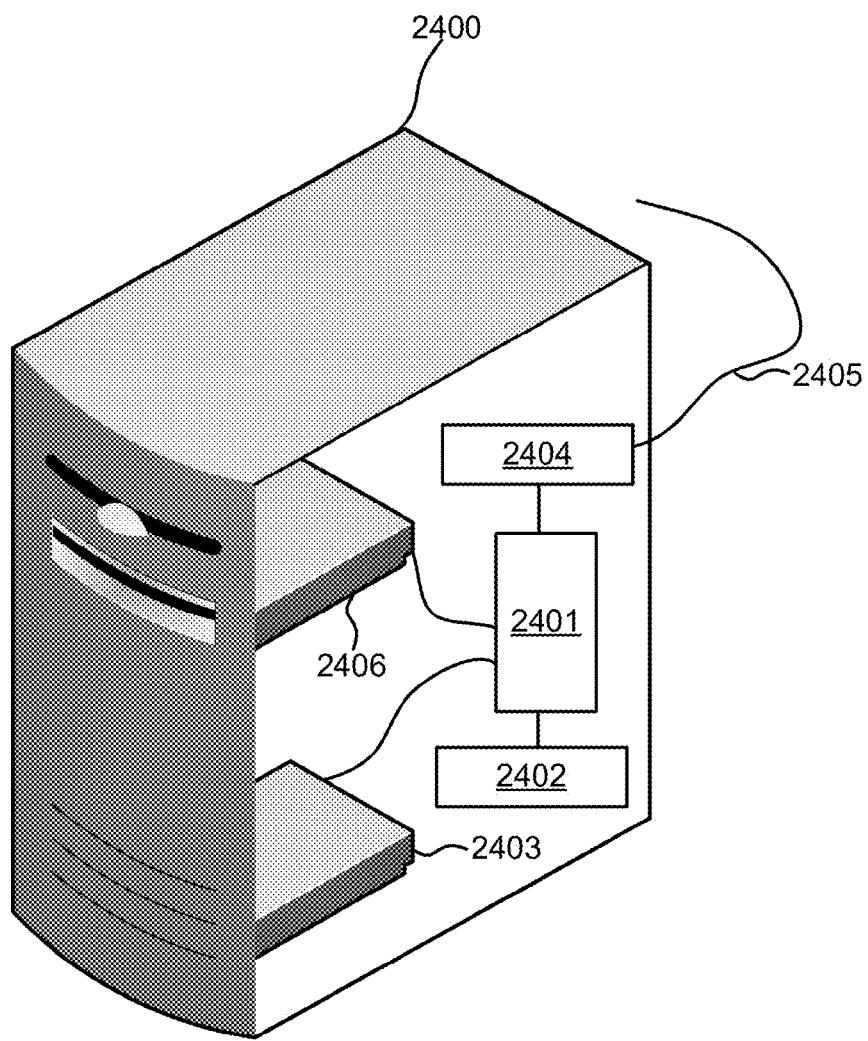
FIG. 10 is a component block diagram of a server device suitable for use in an embodiment.

A number of the embodiments described above may also be implemented with any of a variety of remote server devices, such as the server 2400 illustrated in FIG. 10. Such a server 2400 typically includes a processor 2401 coupled to volatile memory 2402 and a large capacity nonvolatile memory, such as a disk drive 2403. The server 210 may also include a floppy disc drive and/or a compact disc (CD) drive 2406 coupled to the processor 2401. The server 210 may also include network access ports 2404 coupled to the processor 2401 for establishing data connections with network circuits 2405, such as the Internet.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of customizing a user interface menu to display beneficial applications available on a mobile device, comprising:

generating an activity record including a frequency of use for each application used by a user of the mobile device;

generating a priority order of applications available on the mobile device based upon the activity record and an a relationship between a respective one application available on the mobile device and each of the other applications used by the user of the mobile device, wherein generating the priority order of applications available on the mobile device comprises:
  multiplying the frequency of use for each application by affinity weighting factors to generate affinity values for each other application available on the mobile device;
  summing the affinity values for each application to generate a total affinity value; and
  prioritizing the applications available on the mobile device based upon their total affinity values,
determining whether any high priority applications are not included in a current user interface menu displaying a number of applications less than the applications available on the mobile device; and
modifying the user interface menu to display a high priority application in response to determining that the high priority application is not included in the current user interface menu.

2. The method of claim 1, wherein the application may be a software application or a hardware feature.

3. The method of claim 1, wherein:
generating the priority order of applications available on the mobile device further comprises repeating the multiplying step for all applications available on the mobile device;
high priority applications are the applications listed in the user interface menu that have a greatest total affinity value.

4. The method of claim 3, further comprising:
displaying a suggestion to add a high priority application to the current user interface menu in response to determining that any top priority applications are not included in the current user interface menu.

5. The method of claim 4, further comprising:
receiving a user response to the displayed suggestion to add a high priority application to the user interface menu,
wherein modifying the user interface menu to display the high priority application is accomplished in response to receiving a user acceptance of the displayed suggestion.

6. The method of claim 4, further comprising:
receiving a user response to the displayed suggestion to add a high priority application to the user interface menu; and
modifying the affinity weighting factors if the user response indicates a rejection of the displayed suggestion.

7. The method of claim 4, further comprising:
receiving a user response to the displayed suggestions of top priority applications to include in the modified user interface menu, wherein the user's response indicates a modification to the displayed suggestions;
modifying the user interface menu in accordance with the modification to the displayed suggestions; and
modifying the affinity weighting factors to reflect the modification to the displayed suggestion.

8. A method of customizing a user interface menu in a second mobile device to match a customized user interface menu implemented in a first mobile device, comprising:
receiving a first mobile device activity record from the first mobile device;
modifying a stored activity record in the second mobile device to reflect identified applications and frequency of use values contained in the received first mobile device activity record;
generating a priority order of applications available on the second mobile device based upon the received first mobile device activity record and an affinity relationship between a respective one application available on the second mobile device and each of the other applications used by the user of the second mobile device, wherein generating the priority order of applications available on the second mobile device comprises:
  multiplying a frequency of use for each application available on the second mobile device by affinity weighting factors to generate affinity values for each other application available on the second mobile device;
  summing the affinity values for each application available on the second mobile device to generate a total affinity value; and
  prioritizing the applications available on the second mobile device based upon their total affinity values,
determining whether any high priority applications are not included in a current user interface menu displaying a number of applications less than the applications available on the second mobile device; and
modifying the user interface menu to display a high priority application in response to determining that the high priority application is not included in the current user interface menu.

9. The method of claim 8, wherein modifying the stored activity record comprises:
replacing the stored activity record with the received first mobile device activity record.

10. The method of claim 8, wherein modifying the stored activity record comprises:
augmenting the stored activity record with values from the received first mobile device activity record.

11. The method of claim 8, further comprising:
receiving a first affinity table containing modified affinity weighting factors from the first mobile device; and
modifying a second affinity table stored in the second mobile device to reflect the modified affinity weighting factors contained in the received first affinity table.

12. The method of claim 11, wherein modifying the stored affinity table comprises:
replacing the second affinity table with the received first affinity table.

13. A mobile device, comprising:
means for generating an activity record including a frequency of use for each application used by a user of the mobile device;
means for generating a priority order of applications available on the mobile device based upon the activity record and an affinity relationship between a respective one application available on the mobile device and each of the other applications used by the user of the mobile device, wherein means for generating the priority order of applications available on the mobile device comprises:
  means for multiplying the frequency of use for each application by affinity weighting factors to generate affinity values for each other application available on the mobile device;
  means for summing the affinity values for each application to generate a total affinity value; and
  means for prioritizing the applications available on the mobile device based upon their total affinity values,
means for determining whether any high priority applications are not included in a current user interface menu displaying a number of applications less than the applications available on the mobile device; and means for modifying the user interface menu to display a high priority application in response to determining that the high priority application is not included in the current user interface menu.

14. The mobile device of claim 13, wherein the applications may be software applications or hardware features.

15. The mobile device of claim 13, wherein:
means for generating a priority order of applications available on the mobile device further comprises means for repeating the multiplying step for all applications available on the mobile device; and
high priority applications are the applications listed in the user interface menu that have a greatest total affinity value.

16. The mobile device of claim 15, further comprising:
means for displaying a suggestion to add a high priority application to the current user interface menu in response to determining that any of the top priority applications are not included in the current user interface menu.

17. The mobile device of claim 16, further comprising:
means for receiving a user response to the displayed suggestion to add a high priority application to the user interface menu,
wherein means for modifying the user interface menu to display the high priority application comprises means for modifying the user interface menu in response to receiving a user acceptance of the displayed suggestion.

18. The mobile device of claim 16, further comprising:
means for receiving a user response to the displayed suggestion to add a high priority application to the user interface menu; and
means for modifying the affinity weighting factors.

19. The mobile device of claim 18, further comprising:
means for receiving a user's response to the displayed suggestions of top priority applications to include in the modified user interface menu, wherein the user's response indicates a modification to the displayed suggestions;
means for modifying the user interface menu in accordance with the modification to the displayed suggestions; and
means for modifying the affinity weighting factors to reflect the modification to the displayed suggestion.

20. A mobile device, comprising:
means for storing an activity record;
means for storing affinity tables;
means for receiving a first mobile device activity record from a first mobile device;
means for modifying a stored activity record to reflect identified applications and frequency of use values contained in the received first mobile device activity record;
means for generating a priority order of applications available on the mobile device based upon the received first mobile device activity record and an affinity relationship between a respective one application available on the mobile device and each of the other applications used by the user of the mobile device, wherein means for generating the priority order of applications available on the mobile device comprises:
means for multiplying a frequency of use for each application available on the mobile device by affinity weighting factors to generate affinity values for each other application available on the mobile device;
means for summing the affinity values for each application available on the mobile device to generate a total affinity value; and
means for prioritizing the applications available on the mobile device based upon their total affinity values,
means for determining whether any high priority applications are not included in a current user interface menu displaying a number of applications less than the applications available on the mobile device; and
means for modifying the user interface menu to display a high priority application in response to determining that the high priority application is not included in the current user interface menu.

21. The mobile device of claim 20, wherein means for modifying the stored activity record further comprises:
means for replacing the stored activity record with the received first mobile device activity record.

22. The mobile device of claim 20, wherein means for modifying the stored activity record further comprises:
means for augmenting the stored activity record with values from the received first mobile device activity record.

23. The mobile device of claim 20, further comprising:
means for receiving a first affinity table containing modified affinity weighting factors from the first mobile device; and
means for modifying a stored affinity table to reflect the modified affinity weighting factors contained in the received first affinity table.

24. The mobile device of claim 23, wherein means for modifying the stored affinity table comprises:
means for replacing the stored affinity table with the received first affinity table.

25. A mobile device, comprising:
a processor; and
a memory coupled to the processor, wherein the processor is configured to perform operations comprising:
generating an activity record including a frequency of use for each application used by a user of the mobile device;
generating a priority order of applications available on the mobile device based upon the activity record and an affinity relationship between a respective one application available on the mobile device and each of the other applications used by the user of the mobile device, wherein generating the priority order of applications available on the mobile device comprises:
multiplying the frequency of use for each application by affinity weighting factors to generate affinity values for each other application available on the mobile device;
summing the affinity values for each application to generate a total affinity value; and
prioritizing the applications available on the mobile device based upon their total affinity values,
determining whether any high priority applications are not included in a current user interface menu displaying a number of applications less than the applications available on the mobile device; and
modifying the user interface menu to display a high priority application in response to determining that the high priority application is not included in the current user interface menu.

26. The mobile device of claim 25, wherein the applications include at least one of a software application and a hardware feature.

27. The mobile device of claim 25, wherein the processor is configured to perform operations such that:

generating the priority order of applications available on the mobile device further comprises repeating the multiplying step for all applications available on the mobile device; and high priority applications are the applications listed in the user interface menu that have a greatest total affinity value.

28. The mobile device of claim 27, wherein the processor is configured to perform operations further comprising:
displaying a suggestion to add a high priority application to the current user interface menu in response to determining that any of the top priority applications are not included in the current user interface menu.

29. The mobile device of claim 28, wherein the processor is configured to perform operations further comprising:
receiving a user response to the displayed suggestion to add a high priority application to the user interface menu, wherein modifying the user interface menu to display the high priority application is accomplished in response to receiving a user acceptance of the displayed suggestion.

30. The mobile device of claim 28, wherein the processor is configured to perform operations further comprising:
receiving a user response to the displayed suggestion to add a high priority application to the user interface menu; and
modifying the affinity weighting factors.

31. The mobile device of claim 28, wherein the processor is configured to perform operations further comprising:
receiving a user's response to the displayed suggestions of top priority applications to include in the modified user interface menu, wherein the user's response indicates a modification to the displayed suggestions;
modifying the user interface menu in accordance with the modification to the displayed suggestions; and
modifying the affinity weighting factors to reflect the modification to the displayed suggestion.

32. A mobile device, comprising:
a processor; and
a memory coupled to the processor, wherein the processor is configured to perform operations comprising:
receiving a first mobile device activity record from a first mobile device;
modifying a stored activity record to reflect identified applications and frequency of use values contained in the received first mobile device activity record;
generating a priority order of applications available on the mobile device based upon the received first mobile device activity record and an affinity relationship between a respective one application available on the mobile device and each of the other applications used by the user of the mobile device, wherein generating the priority order of applications available on the mobile device comprises:
multiplying a frequency of use for each application available on the mobile device by affinity weighting factors to generate affinity values for each other application available on the mobile device;
summing the affinity values for each application available on the mobile device to generate a total affinity value; and
prioritizing the applications available on the mobile device based upon their total affinity values;
determining whether any high priority applications are not included in a current user interface menu displaying a number of applications less than the applications available on the mobile device; and
modifying the user interface menu to display a high priority application in response to determining that the high priority application is not included in the current user interface menu.

33. The mobile device of claim 32, wherein the processor is configured to perform operations such that modifying the stored activity record comprises:
replacing the stored activity record with the received first mobile device activity record.

34. The mobile device of claim 32, wherein the processor is configured to perform operations such that modifying the stored activity record comprises:
augmenting the stored activity record with values from the received first mobile device activity record.

35. The mobile device of claim 32, wherein the processor is configured to perform operations further comprising:
receiving a first affinity table containing modified affinity weighting factors; and modifying an affinity table stored in the memory to reflect the modified affinity weighting factors contained in the received first affinity table.

36. The mobile device of claim 35, wherein the processor is configured to perform operations such that modifying the stored affinity table comprises: replacing the affinity table stored in the memory with the received first affinity table.

37. A non-transitory computer-readable storage medium having stored thereon processor-executable software instructions configured to cause a processor to perform operations comprising:
generating an activity record including a frequency of use for each application used by a user of a mobile device;
generating a priority order of applications available on the mobile device based upon the activity record and an affinity relationship between a respective one application available on the mobile device and each of the other applications used by the user of the mobile device,
wherein generating the priority order of applications available on the mobile device comprises:
multiplying the frequency of use for each application by affinity weighting factors to generate affinity values for each other application available on the mobile device;
summing the affinity values for each application to generate a total affinity value; and
prioritizing the applications available on the mobile device based upon their total affinity values,
determining whether any high priority applications are not included in a current user interface menu displaying a number of applications less than the applications available on the mobile device; and
modifying the user interface menu to display a high priority application in response to determining that the high priority application is not included in the current user interface menu.

38. The non-transitory computer-readable storage medium of claim 37, wherein the stored processor-executable software instructions are configured to cause the processor to perform further operations such that:
generating the priority order of applications available on the mobile device further comprises repeating the multiplying step for all applications available on the mobile device;
high priority applications are the applications listed in the user interface menu that have a greatest total affinity value.

39. The non-transitory computer-readable storage medium of claim 38, wherein the stored processor-executable software instructions are configured to cause the processor to perform further operations comprising:

displaying a suggestion to add a high priority application to the current user interface menu in response to determining that any of the top priority applications are not included in the current user interface menu.

40. The non-transitory computer-readable storage medium of claim 39, wherein the stored processor-executable software instructions are configured to cause the processor to perform further operations comprising:

receiving a user response to the displayed suggestion to add a high priority application to the user interface menu, wherein modifying the user interface menu to display the high priority application is accomplished in response to receiving a user acceptance of the displayed suggestion.

41. The non-transitory computer-readable storage medium of claim 39, wherein the stored processor-executable software instructions are configured to cause the processor to perform further operations comprising:

receiving a user response to the displayed suggestion to add a high priority application to the user interface menu; and
modifying the affinity weighting factors.

42. The non-transitory computer-readable storage medium of claim 39, wherein the stored processor-executable software instructions are configured to cause the processor to perform further operations comprising:

receiving a user's response to the displayed suggestions of top priority applications to include in the modified user interface menu, wherein the user's response indicates a modification to the displayed suggestions;
modifying the user interface menu in accordance with the modification to the displayed suggestions; and
modifying the affinity weighting factors to reflect the modification to the displayed suggestion.

43. A non-transitory computer-readable storage medium having stored thereon processor-executable software instructions configured to cause a processor of a mobile device to perform operations comprising:

receiving a first mobile device activity record from a first mobile device;
modifying a stored activity record in the mobile device to reflect identified applications and frequency of use values contained in the received first mobile device activity record;
generating a priority order of applications available on the mobile device based upon the received first mobile device activity record and an affinity relationship between a respective one application available on the mobile device and each of the other applications used by the user of the mobile device, wherein generating the priority order of applications available on the mobile device comprises:
multiplying a frequency of use for each application available on the mobile device by affinity weighting factors to generate affinity values for each other application available on the mobile device;
summing the affinity values for each application available on the mobile device to generate a total affinity value; and
prioritizing the applications available on the mobile device based upon their total affinity values,
determining whether any high priority applications are not included in a current user interface menu displaying a number of applications less than the applications available on the mobile device; and
modifying the user interface menu to display a high priority application in response to determining that the high priority application is not included in the current user interface menu.

44. The non-transitory computer-readable storage medium of claim 43, wherein the stored processor-executable software instructions are configured to cause the processor to perform further operations such that modifying the stored activity record comprises:
replacing the stored activity record with the received first mobile device activity record.

45. The non-transitory computer-readable storage medium of claim 43, wherein the stored processor-executable software instructions are configured to cause the processor to perform further operations such that modifying the stored activity record comprises:
augmenting the stored activity record with values from the received first mobile device activity record.

46. The non-transitory computer-readable storage medium of claim 43, wherein the stored processor-executable software instructions are configured to cause the processor to perform further operations comprising:
receiving a first affinity table containing modified affinity weighting factors from the first mobile device; and
modifying a second affinity table stored in the mobile device to reflect the modified affinity weighting factors contained in the received first affinity table.

47. The non-transitory computer-readable storage medium of claim 46, wherein the stored processor-executable software instructions are configured to cause the processor to perform further operations such that modifying the stored affinity table comprises:
replacing the second affinity table with the received first affinity table.

48. The method of claim 8, wherein:
generating the priority order of applications available on the second mobile device further comprises repeating the multiplying step for all applications available on the second mobile device; and
high priority applications are the applications listed in the user interface menu that have a greatest total affinity value.

49. The mobile device of claim 20, wherein:
means for generating the priority order of applications available on the mobile device further comprises means for repeating the multiplying step for all applications available on the mobile device; and
high priority applications are the applications listed in the user interface menu that have a greatest total affinity value.

50. The mobile device of claim 32, wherein the processor is configured to perform operations such that:
generating the priority order of applications available on the mobile device further comprises repeating the multiplying step for all applications available on the mobile device; and
high priority applications are the applications listed in the user interface menu that have a greatest total affinity value.

51. The non-transitory computer-readable storage medium of claim 43, wherein the stored processor-executable software instructions are configured to cause the processor to perform operations such that:
generating the priority order of applications available on the mobile device further comprises repeating the multiplying step for all applications available on the mobile device; and high priority applications are the applications listed in the user interface menu that have a greatest total affinity value.

* * * * *